United States Patent [19]
Baldock
[11] B 3,987,221
[45] Oct. 19, 1976

[54] METHOD FOR PREPARING RECEPTOR SHEET FOR USE IN PHOTOGRAPHIC DIFFUSION PROCESS

[75] Inventor: Terence William Baldock, Essex, England

[73] Assignee: Minnesota Mining and Manufacturing Company, St. Paul, Minn.

[22] Filed: July 6, 1971

[21] Appl. No.: 160,099

[44] Published under the second Trial Voluntary Protest Program on January 13, 1976 as document No. B 160,099.

[30] Foreign Application Priority Data

July 7, 1970 United Kingdom .............. 32975/70

[52] U.S. Cl. ................................ 427/343; 96/29 R; 96/48 PD

[51] Int. Cl.[2] ...................... B44D 1/44; C08H 19/00

[58] Field of Search ........... 96/29, 76; 117/62, 118, 117/34; 427/343

[56] References Cited

UNITED STATES PATENTS

| | | | |
|---|---|---|---|
| 3,532,497 | 10/1970 | Goffe | 96/29 |
| 3,647,440 | 3/1972 | Rasch | 96/29 |

*Primary Examiner*—David Klein
*Assistant Examiner*—John L. Goodrow
*Attorney, Agent, or Firm*—Alexander, Sell, Steldt & DeLaHunt

[57] ABSTRACT

A method for preparing nuclei for use in receptor sheets in the photographic silver salt diffusion transfer process, the method comprising preparing a controlled size suspension of metal salt particles and converting the particles, in suspension, to corresponding particles of free metal or metal sulfide.

3 Claims, No Drawings

METHOD FOR PREPARING RECEPTOR SHEET FOR USE IN PHOTOGRAPHIC DIFFUSION PROCESS

This invention relates to receptor sheets for use in photographic silver salt diffusion transfer processes and is particularly concerned with a process for the preparation of such sheets.

BACKGROUND TO THE INVENTION

In photographic silver salt diffusion transfer processes a donor sheet comprising a silver halide emulsion is exposed to a light image, then processed in close contact with an image receptor sheet with an interposed thin layer of a processing solution containing a developer and a silver halide solvent. In exposed areas of the donor emulsion, a silver negative image is developed, whilst in unexposed areas the undeveloped silver halide is dissolved to form a soluble silver complex which diffuses to the receptor. The receptor sheet contains catalytic particles, or nuclei, which catalyse the reduction of the dissolved silver complex by unused developer to form a positive silver image on the receptor.

The deposition of silver, or in some cases other metals, onto catalytic nuclei by reduction of a dissolved metal salt is generally called physical development. Photographic silver salt diffusion transfer processes use physical development to provide a positive image by one-step processing, and the image so obtained is usually required to be of neutral colour, rapidly formed, and of high density. These properties are controlled to a large extent by the size and nature of the physical development nuclei incorporated in the receptor sheet.

Physical development nuclei usually consist of silver, gold or other heavy metal, or their sulfides or selenides. The easilyprepared colloidal suspensions of these substances are commonly used, giving rapid development and image silver of high covering power, but suffer from the disadvantage of producing brown-coloured images. Various organic image toning agents have been suggested to overcome this problem, as also has the use of a fine particulate inert support for the nuclei, such as silica. Both of these methods may have disadvantages; for example organic toners may have undesirable photographic side-effects, and particulate supports may lead to unwanted opacity in the receptor.

While receptor nuclei of a larger particle size give a more neutral-toned image, the controlled precipitation of such nuclei from simple solutions is difficult to achieve reproducibly, and if the particle size exceeds an optimum value, the resulting nuclei have poor catalytic properties and produce image silver of low covering power on physical development.

It is, therefore, an object of the invention to provide an improved way of preparing these nuclei.

BRIEF SUMMARY OF THE INVENTION

According to the invention there is provided a process for the preparation of nuclei for use as a layer on a receptor sheet comprising preparing a suspension of particles of a metal salt which is one having a solubility such that it can be precipitated in a controllable way and which is capable of being converted in dispersed form to the corresponding metal sulfide, this sulfide being less soluble in water than the metal salt or the metal itself, the metal of the metal salt being one which is catalytically active in physical development when converted to nuclei of the metal sulfide or of the metal itself, e.g. wherein the metal or metal sulfide nuclei are catalytic to the physical development of silver thereon, and thereafter converting the metal salt to the metal sulfide or metal itself so as to provide nuclei of the metal sulfide or metal itself.

The receptor sheet can be given a coating of these nuclei by, for example, coating the metal salt suspension upon a suitable base sheet and thereafter converting the suspension of the metal salt to nuclei of the metal sulfide or of the metal itself, or the nuclei can be formed and then coated onto the base sheet.

By following this process one can produce nuclei of the metal sulfide or of the metal itself which are not necessarily of a known size but are of a size which is closely related to the size of the particles in the suspension of the metal salt. Since the particles of the latter suspension can be formed to a controlled size it is therefore possible to form the required nuclei so that they are of a size which can be reproduced at will. The nuclei formed will not necessarily be single particles of a size comparable with those of the parent suspension but they may also consist of smaller particles in clusters, the size and/or shape of which are controlled by the size and/or shape of the particles in the metal suspension.

It is possible, according to the invention, to prepare nuclei of such a size that upon use of the receptor sheets in a photographic physical development process a neutral grey or black image is obtained without the use of organic toning agents. In addition, it is found that the nuclei prepared according to the invention can be used in receptor sheets to give excellent image reproduction using a diffusion transfer process. Generally these nuclei which give the desired grey or black image have a size of from 0.05 to 0.5 $\mu$.

If the metal salt is only slightly soluble in water and not as insoluble as is the metal sulfide or the metal which form the final nuclei, it is possible to precipitate the metal salt in a suspension so that the particles of metal salt are of a required size, and this size can also be increased by continuing precipitation until the metal salt particles have the required size.

When the nuclei are coated on the receptor sheet they need to be suspended in a suitable water permeable binder. By following the invention, the metal salt suspension can be an emulsion prepared in a suitable binder such as gelatin or certain synthetic polymers, e.g. acrylate homo- or copolymers and so conversion to the metal sulfide or metal nuclei automatically provides them in the binder. The metal salt can, for example, be converted to the metal sulfide by treatment with a sulfiding agent such as sodium sulfide or to the metal itself by treatment with a reducing agent.

When the metal salt is precipitated it is done in a manner which produces a precipitate having fairly regular particles with a narrow spread of particle sizes and the size of these particles must be approximately that required or it must be possible to grow the particles to the required size. This is what is meant by the term "precipitating in a controlled way."

Suitable metals which form salts which can be precipitated in this controlled way and thereafter converted to less soluble sulfide or the metal itself include, for example, lead, cadmium, gold, copper, cobalt, nickel and mercury. The preferred metal, however, is silver because the controlled precipitation and growth of silver halide grains in water permeable binders such as gelatin is widely practiced and used in silver halide photography. One can, therefore, prepare a silver halide emulsion in a well known manner and then treat this with, for example, sodium sulfide, to provide silver sulfide nuclei of a grain size related to the grain size of the silver halide particles in the original emulsion. In addition these silver sulfide nuclei are excellent nuclei for use in physical development processes.

Preferably the nuclei are coated on a base sheet at a coating rate such as to provide from 1 to 2mg of the metal per $dm^2$.

Suitable base sheets include any of those used in silver halide photography such as, for example, paper sheets, polymeric supports e.g. cellulose acetate or polyester sheets and glass.

The invention will now be illustrated by the following examples.

EXAMPLE 1

A silver chloride emulsion of mean grain diameter $0.15\mu$, treated with the usual hardeners and coating aids, was coated on a gelatinsubbed polyester film base to give a silver coating weight of $1g/m^2$ and a gelatin coating weight of $1g/m^2$. The dried coating was dipped in a bath of 0.03% sodium sulfide solution until a very pale brown colour was observed. The coating was then washed, fixed to remove unreacted silver chloride, washed once more and dried. This coating had a silver sulfide coating weight $0.15g/m^2$. Microscopic examination of the silver sulfide particles showed them to be substantially similar in size to the original silver chloride particles.

This coating was used as the receptor sheet in a silver diffusion transfer process. The image formed thereon by physical development was of a neutral grey-black colour.

For comparison, a similar silver diffusion transfer image was formed on a receptor sheet containing colloidal silver sulfide nuclei prepared by reaction of silver nitrate with thiourea. The image in this case was orange-brown in colour. In neither case was an organic toning agent employed. As can be seen, therefore, the coating according to the invention gave, upon physical development, a neutral grey-black image and not an undesirable orange-brown image. The coating was, however, easy to prepare.

EXAMPLE 2

A receptor sheet prepared as in Example 1 was physically developed by immersion in a mixture of the following solutions, solution A having been added to solution B immediately before the immersion of the receptor sheet:

| | |
|---|---|
| Solution A | |
| silver nitrate | 0.8g |
| potassium thiosulphate | 8g |
| water | 50ml |
| Solution B | |
| amidol | 1g |
| sodium sulphite anhydrous | 20g |
| water | 200ml. |

A neutral grey-black silver deposit was formed. For comparison, a colloidal silver sulfate receptor in the same bath gave an orange-brown silver deposit.

I claim:

1. A method for preparing a receptor sheet for use in the photographic silver salt diffusion process, said method comprising preparing a silver halide photographic emulsion of controlled silver halide grain size, coating said emulsion as a layer on a substrate, and converting said silver halide to silver sulfide by treatment with a sulfiding agent.

2. The method of claim 1 wherein said sulfiding agent is sodium sulfide.

3. The method of claim 1 wherein said silver halide grain size is from 0.05 microns to 0.5 microns.

* * * * *